United States Patent [19]

Graham

[11] 4,325,823

[45] Apr. 20, 1982

[54] WASTEWATER TREATMENT SYSTEM

[75] Inventor: Thomas S. Graham, Loomis, Calif.

[73] Assignee: Tom Graham & Associates, Loomis, Calif.

[21] Appl. No.: 150,206

[22] Filed: May 12, 1980

[51] Int. Cl.³ .............................................. B01D 21/24
[52] U.S. Cl. ..................................... 210/86; 210/104; 210/109; 210/170; 210/199; 210/207; 210/532.2
[58] Field of Search ........................................ 210/2–9, 210/14, 15, 16, 86, 109, 170, 198 R, 199, 205, 220, 221 P, 252, 258, 260, 262, 532.2, 601, 614, 620, 628, 629, 630, 605, 747, 104, 207

[56] References Cited

U.S. PATENT DOCUMENTS

| 2,889,929 | 6/1959 | Kivell | 210/4 |
| 3,054,602 | 9/1962 | Proudman | 210/15 |
| 3,202,285 | 8/1965 | Williams | 210/16 |
| 3,834,536 | 9/1974 | Kelsey | 210/104 |
| 3,907,672 | 9/1975 | Milne | 210/170 |
| 3,923,656 | 12/1975 | Krebs et al. | 210/170 |
| 4,021,347 | 5/1977 | Teller et al. | 210/195.1 |
| 4,092,249 | 5/1978 | LaGatta | 210/195.1 |
| 4,139,471 | 2/1979 | Foti | 210/170 |

FOREIGN PATENT DOCUMENTS 506337 4/1926 Fed. Rep. of Germany ........ 210/15

Primary Examiner—Peter A. Hruskoci
Attorney, Agent, or Firm—Mark C. Jacobs

[57] ABSTRACT

A system for treating wastewater comprising a treatment tank divided into three fluidly interconnected compartments, the first compartment being a blending cell divided into an upper anaerobic compartment and a lower aerobic compartment. The second compartment is a decomposition cell, the third compartment is a purification cell and air is selectively introduced into each of the cells thereby providing a wastewater treatment system having the hydraulic flows and oxygen necessary to optimize the aerobic processes.

7 Claims, 10 Drawing Figures

WASTEWATER TREATMENT SYSTEM

BACKGROUND OF THE INVENTION

1. Field of the Invention

The invention relates to sewage treatment; and, more particularly, to a system for treating wastewater.

2. Description of the Prior Art

The migration of people and industry to areas beyond public sewers has resulted in the mass use of septic tanks. Lacking efficient equipment, little could be done to counteract the capacity of the soil to accept sewage waste or the effect these wastes have on sub-surface ground water commonly used by home and community as "clean" drinking water. There are a great many septic tank and associated tile field failures. Foul smelling, germ laden sewage is often forced to the surface in and around inhabited areas, and well water contamination has resulted in many areas.

Septic tanks are anaerobic wastewater treatment systems having many disadvantages. Today, many conventional single homes are employing aerobic wastewater treatment systems which are designed to meet accepted criteria relative to load factors, retention times, aerates and the like. Load fluctuations in these single homes require that one exert close control and maintenance to insure good treatment. As a result, many sanitary engineering agencies have discouraged the use of single home aerobic treatment systems. Accordingly, a wastewater treatment system that provides the compartmentation, hydraulic flows and oxygen necessary to optimize the aerobic processes and which does not have the disadvantages of a septic tank is needed in the marketplace.

The disadvantages of the well-accepted septic tank anaerobic system, that is, bacterial action without the presence of oxygen, is as follows. Underground sewage disposal systems, such as septic tanks, have raw sewage entering the tank, which is concrete, through a submerged inlet pipe. Within the tank, biochemical action converts some of the sewage solids to liquid form and others to gas. Three levels of sewage result. Solids sink to the bottom and form a sludge layer. Oily materials, which are lighter than water, float to the top and form a scum layer which is disposed upon the balance of the liquid, namely effluent, which occupies most of the volume of the system. Such systems are disposed in holes without any space between the dirt and the walls, in order to prevent any possible rupture due to pressure buildup. The location of the sewage system may be marked at the ground surface just above the pump out opening. When the sludge layer has built up to a sufficient amount, it becomes necessary for a professional septic tank cleaner crew to pump out the contents of the tank. Due to the nature of a septic tank system, it is possible that the sludge and scum materials could back up through the home sewer system from the inlet pipe. Periodic cleaning of the sewage tank can by costly, but is, of course, necessary in that basically a septic tank is a batch process disposal system.

Improvements have been made in the waste disposal art by the design of fiberglass septic tanks to replace concrete units, The waste disposal art has also moved toward an aerobic-type system, such a system being disclosed in U.S. Pat. No. 3,834,536 to Kelsey.

SUMMARY OF THE INVENTION

It is an object of this invention to provide an improved aerobic wastewater treatment system.

It is another object of this invention to provide a multicompartmented wastewater treatment tank having three compartments with both an aerobic and an anaerobic section.

It is still another object of this invention to provide a continuous wastewater treatment system that prevents the depositing of solids in the disposal field.

These and other objects are preferably accomplished by providing a tank having three discrete chambers therein, the first of which is interconnected to the second and the second of which is interconnected to the third. The first chamber is a blending cell, the second chamber is a decomposition cell and the third chamber is a purification cell. The first section or chamber is a combination of an upper aerobic and a lower anaerobic compartment disposed one above the other and in fluid communication with each other.

Means are provided for introducing air into each of the compartments at predetermined intervals and fail safe means and alarms may also be provided. Thus, an improved wastewater treatment system is provided which quickly and efficiently breaks down waste and prevents the removal of solids to a leach field or the like.

DESCRIPTION OF THE PREFERRED EMBODIMENT

Figure 1:
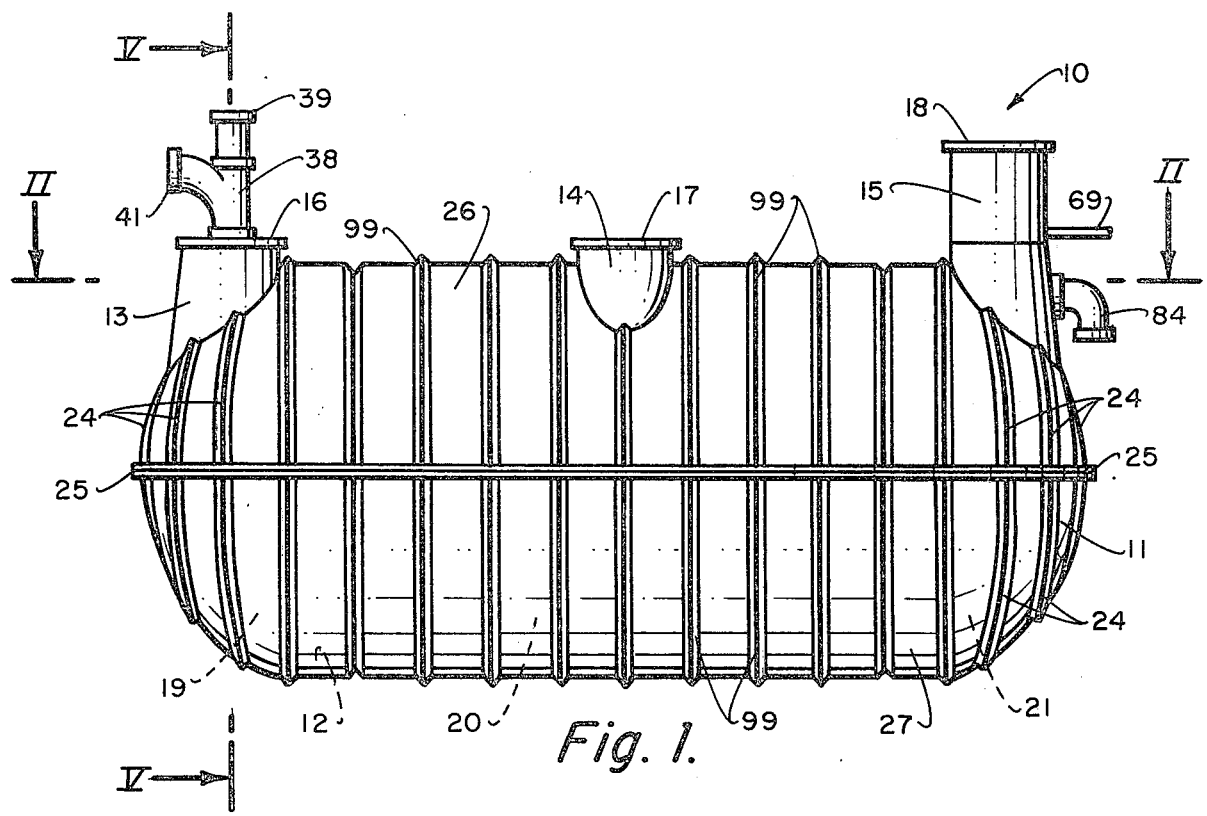
FIG. 1 is an elevational side view of a wastewater treatment system in accordance with the invention.
Figure 2:
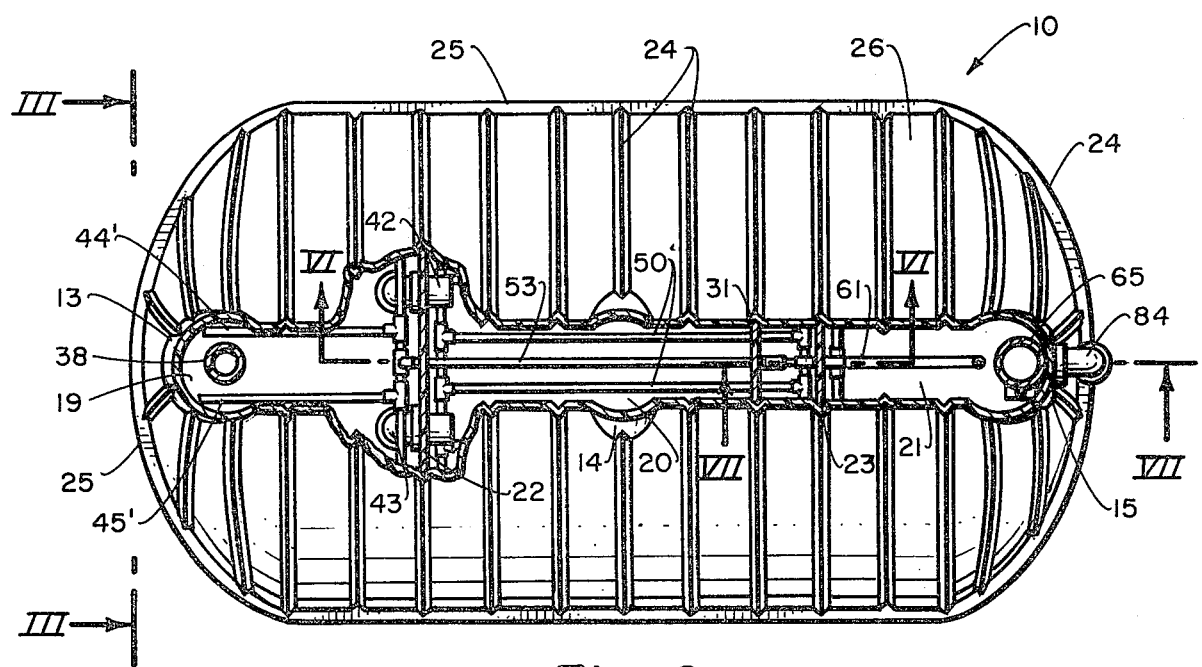
FIG. 2 is a view taken along the lines II—II of FIG. 1.
Figure 3:
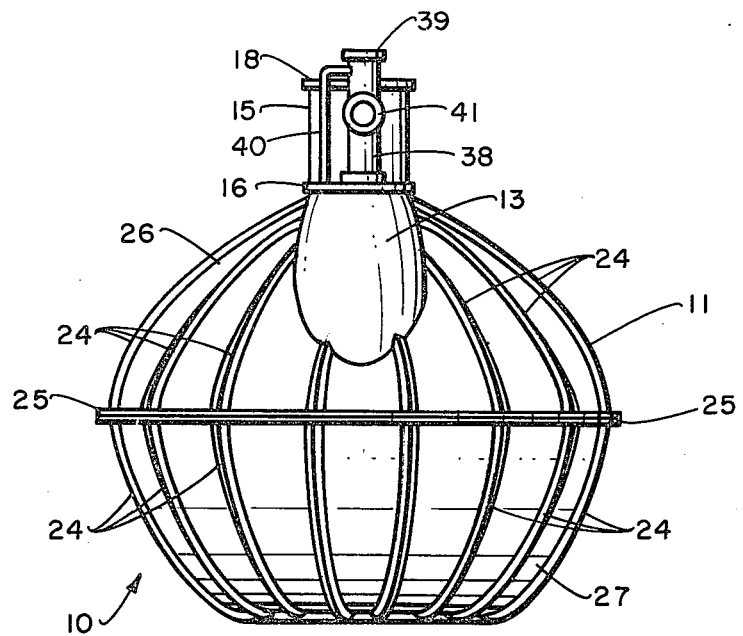
FIG. 3 is a view taken along the lines III—III of FIG. 2.

Referring now to FIG. 1 of the drawing, a wastewater treatment tank 10 is shown having an outer shell 11 and a generally hollow interior 12. Preferably, tank 10 is generally oval in configuration and may be a conversion of a conventional septic tank. Of course, tank 10 may be any suitable configuration, such as rectangular, and of any suitable materials, preferably fiberglass. Tank 10 has three towers 13 through 15 (see also FIG. 2) projecting upwardly therefrom, each having removable manhole covers 16 through 18 mounted thereon for access to the interior of each internal compartment (as will be discussed) for the insertion, removal and maintenance of the working elements therein. As can be seen in FIGS. 1 and 2, tank 10 is divided internally into three separable chambers 19 through 21, Chamber 19, as will be discussed, is a blending chamber separated from chamber 20 by a suitable baffle 22. A baffle 23 separates chamber 20 from chamber 21. As will also be discussed, chamber 20 is a decomposition chamber and chamber 21 is a purification chamber. As shown in FIG. 3, tank 10 includes a plurality of generally vertical reinforcing ribs 24 on the exterior thereof and a generally horizontal flange 25 (or a pair of mating flanges on each section) which divides the tank 10 into an upper section 26 and a lower section 27. That is, sections 26 and 27 may be manufactured separately, then joined at flange or flanges 25 to form tank 10.

Figure 4:
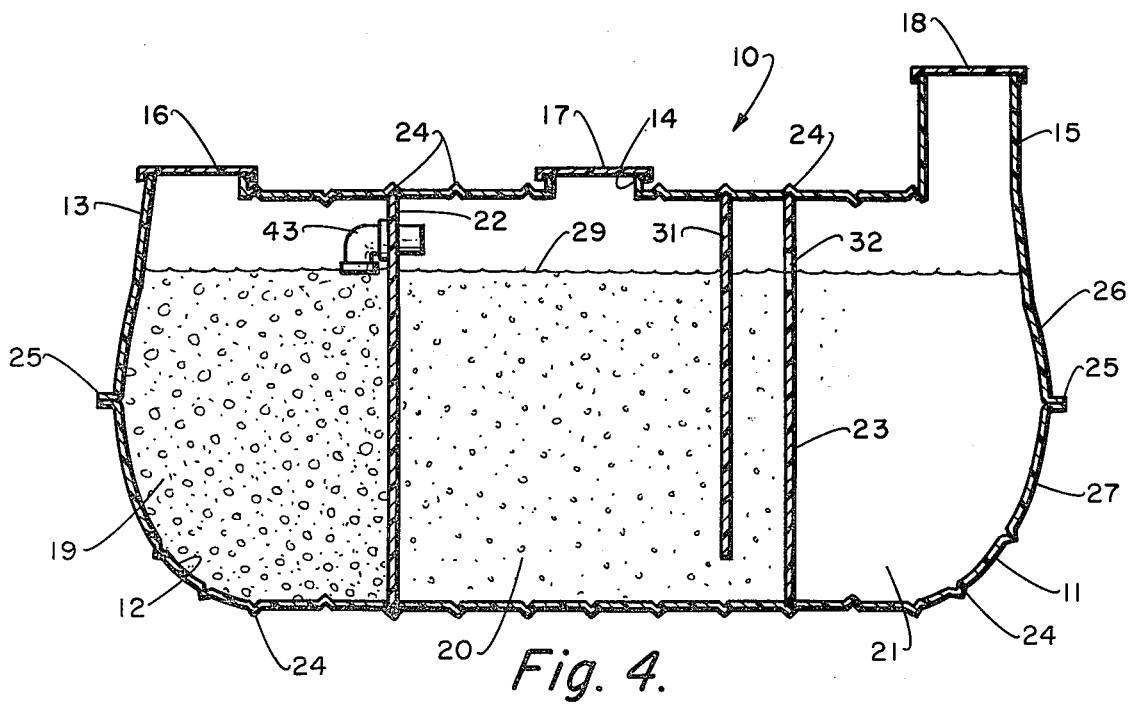
FIG. 4 is a diagrammatic vertical view of the interior of the tank of FIGS. 1 through 3 with parts thereof removed for convenience of illustration.

As shown schematically in FIG. 4, and as previously discussed, chamber 19 is a blending chamber, chamber 20 is a decomposition chamber and chamber 21 is a purification chamber. A pair of short elbows or pipe siphons 42, 43 extend through baffle 22 and communicate the upper portion of chamber 19 with the upper portion of chamber 20 (below liquid level 29). A baffle 31, spaced from the bottom of tank 10, e.g. about 14" or so. separates a portion of chamber 20 from baffle 23. An opening 32 is provided in baffle 23. This increases the setting of solids in tank 10.

Figure 5:
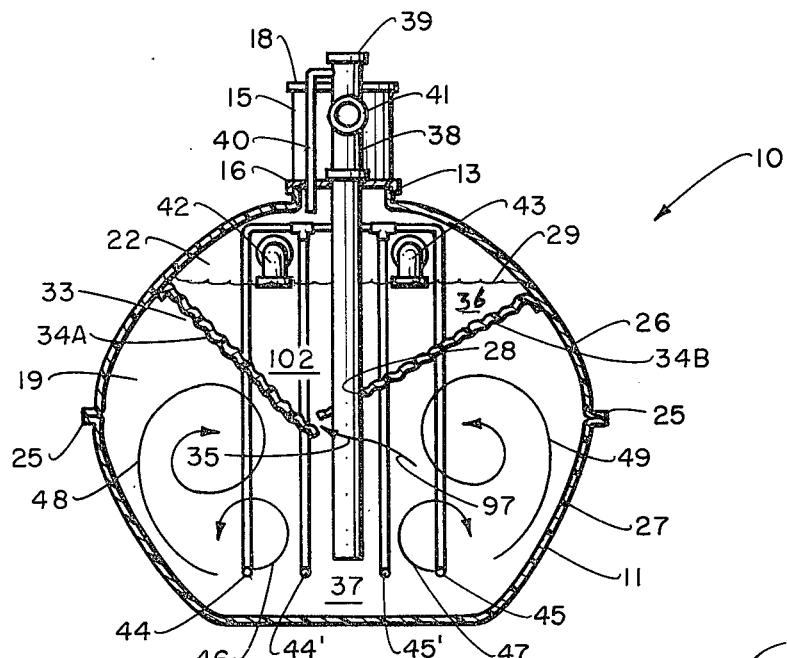
FIG. 5 is a sectional view taken along lines V—V of FIG. 1.

Blending chamber 19 is shown in detail in FIG. 5. Corrugated baffles 34A & 34B form a funnel 33, of any suitable material, such as fiberglass, are mounted in chamber 19 and funnel 33 includes an opening 35 to the bottom thereof. Opening 35 is preferably about 1" wide. This funnel divides chamber 19 into an upper settling compartment 36 and a lower digestion compartment 37. An inlet pipe 38 extends down through cover 16, through funnel 33's baffle 34B via aperture 28 therein, to chamber 37 and is capped at the top by a cleanout plug 39. An air vent 40 extends from pipe 38 down through cover 16 into the top of compartment 36. A wastewater inlet 41 communicates with the interior of pipe 38 above cover 16 for introducing wastewater, as from a home of the like, into the interior of tank 10. A pair of siphons 42,43 "float" on top of the liquid in tank 10 in chamber 19 and are mounted in baffle 22 to fluidly communicate chamber 19 with chamber 20. A plurality of pipes, such as 44, 45, 44' and 45' open into the compartment 37 below opening 35 on each side of pipe 38 for introducing air into compartment 37. As will be discussed, when air is injected into compartment 37 through pipes 44,45,44', and 45', it moves in the direction of arrows 46,47,48 and 49 causing the wastewater in compartment 37 below funnel 33 to move in the direction of arrows 46,47,48 and 49.

Figure 6:
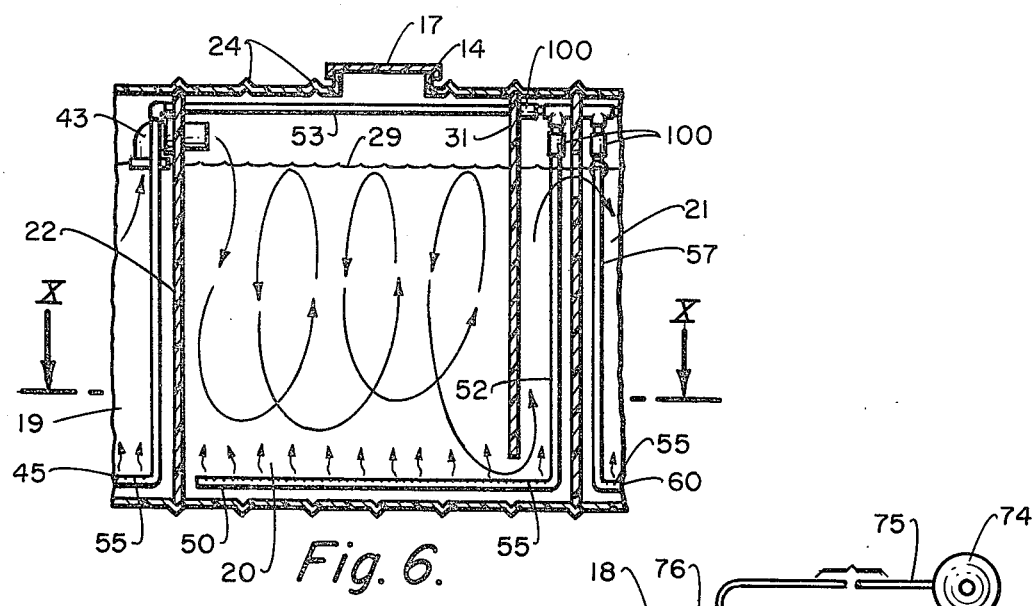
FIG. 6 is a sectional view taken along lines VI—VI of FIG. 2.
Figure 10:
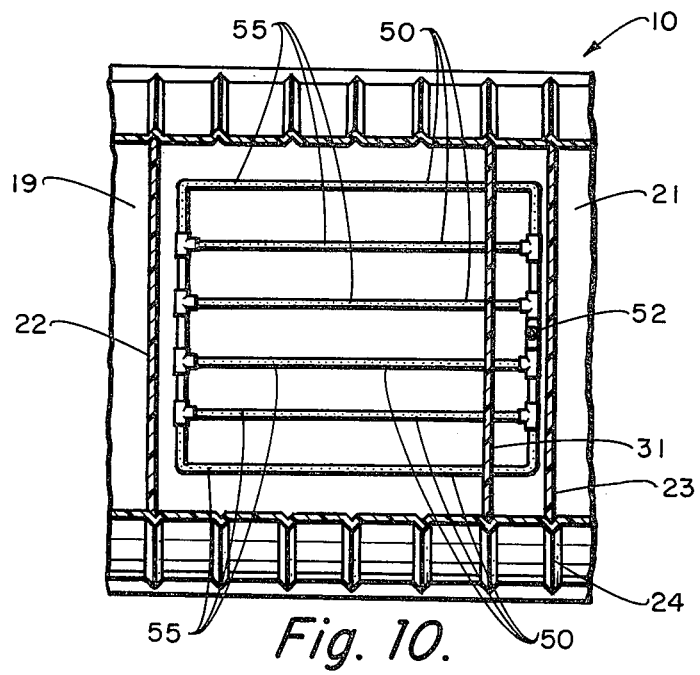
FIG. 10 is a top plan view of the portion of the tank of FIG. 6 taken along lines X—X thereof.

Decomposition chamber 20 is shown in detail in FIG. 6 and includes a plurality of generally horizontally extending spaced perforated pipes 50 (only two being visable in FIG. 6) extending along the bottom of tank 10 for introducing air therein. Pipes 50 is coupled to a vertical manifold pipes 52. An upper horizontal pipe 53 is also provided and extends into chamber 21. The pipes 50 are shown in detail in FIG. 10. As can be seen, six pipes 50 are shown coupled with manifold pipe 52 extending along the bottom of chamber 20. These pipes 50 are perforated, preferably, 1/16" holes and 1" centers, each pipe 50 being about 48" long and preferably of ½" polyvinyl chloride pipe.

Figure 7:
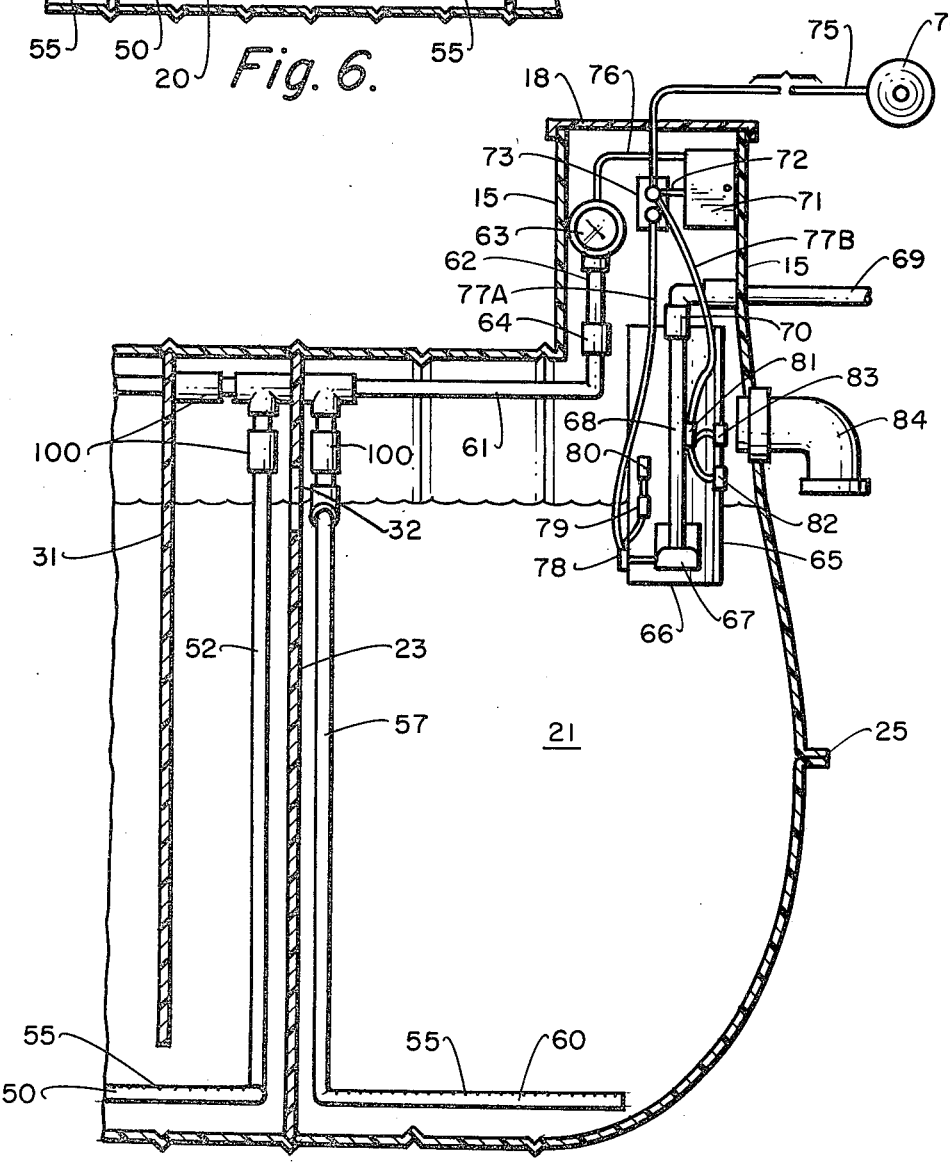
FIG. 7 is a sectional view taken along lines VII—VII of FIG. 2.

Purification chamber 21 is shown in detail in FIG. 7. Pipes 52 and 53 from chamber 20 meet and are coupled to vertical pipes 57. Air line flow gate valves not shown, are employed in each line to regulate the flow of air. Pipes 57 have a junction 58 at the bottom with perforated spaced horizontal pipes 59,60 extending along the bottom of chamber 21. An upper horizontal pipe 61 extends from the junction of pipes 52, 53, and 57 and includes a vertical pipe portion 62 terminating in a conventional air compressor 63. A conventional check valve 64 is provided in pipe portion 62.

A vertical pump-out pipe or tube 65 is mounted in chamber 21 open at the bottom 66. A pump 67 is mounted in tube 65 having a vertical pipe 68 fluidly coupled thereto leading to a horizontal pipe 69 extending to a remote leach field (not shown). A check valve 70 is disposed in pipe 68. A panel 71 is provided in tower 15 below cover 18 electrically coupled, via lead 72, to a piggy-back plug-in assembly 73. An electrical alarm 74, which may be mounted in the home or the like, is coupled via lead 75. Air compressor 63 is coupled to panel 71 via lead 76. Lead 77A, coupled from float switches 79 & 80 at assembly 73, via piggy back plug is coupled to pump 67. A manual pump float off & on switch 78 is coupled to lead 77A mounted on the outer periphery of tube 65 adjacent to the bottom of pipe 68. Pump switch 78 includes a pair of spaced liquid level sensors 79,80, known in the fluids control art, for sensing the level of liquid in chamber 21 and selectively activating pump 67 which is powered by lead 77A. An alarm switch 81 is also mounted in tube 65 and coupled to lead 77B and includes a pair of spaced liquid level sensors 82,83 for sensing the level of liquid in chamber 21 and actuating or deactivating alarm 74 if the liquid level gets too high. A safety outlet 84 communicates with chamber 21 above switch 81 for evacuating the contents of chamber 21 should it rise to too high a level.

Figure 8:
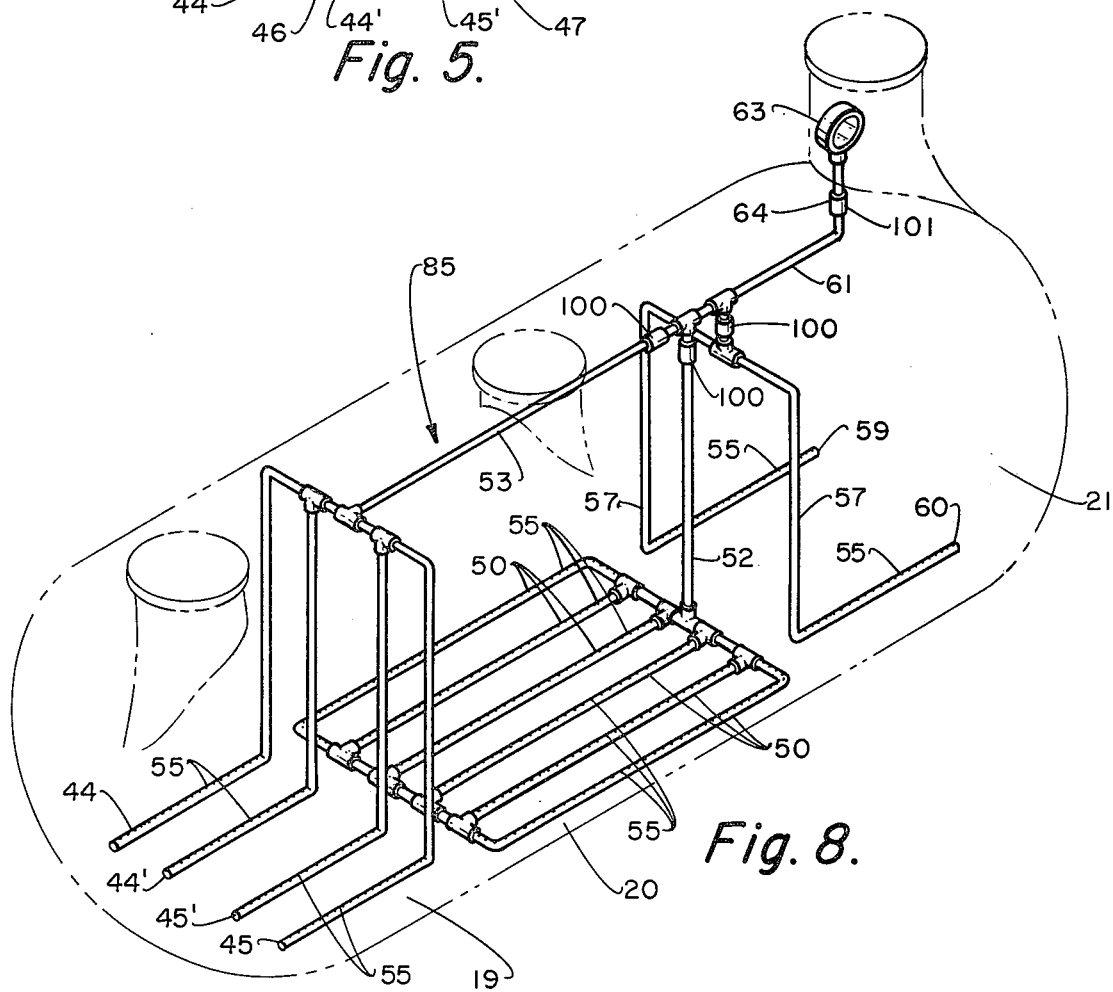
FIG. 8 is a schematic view showing the aeration flow that takes place in the tank of the invention.
Figure 9:
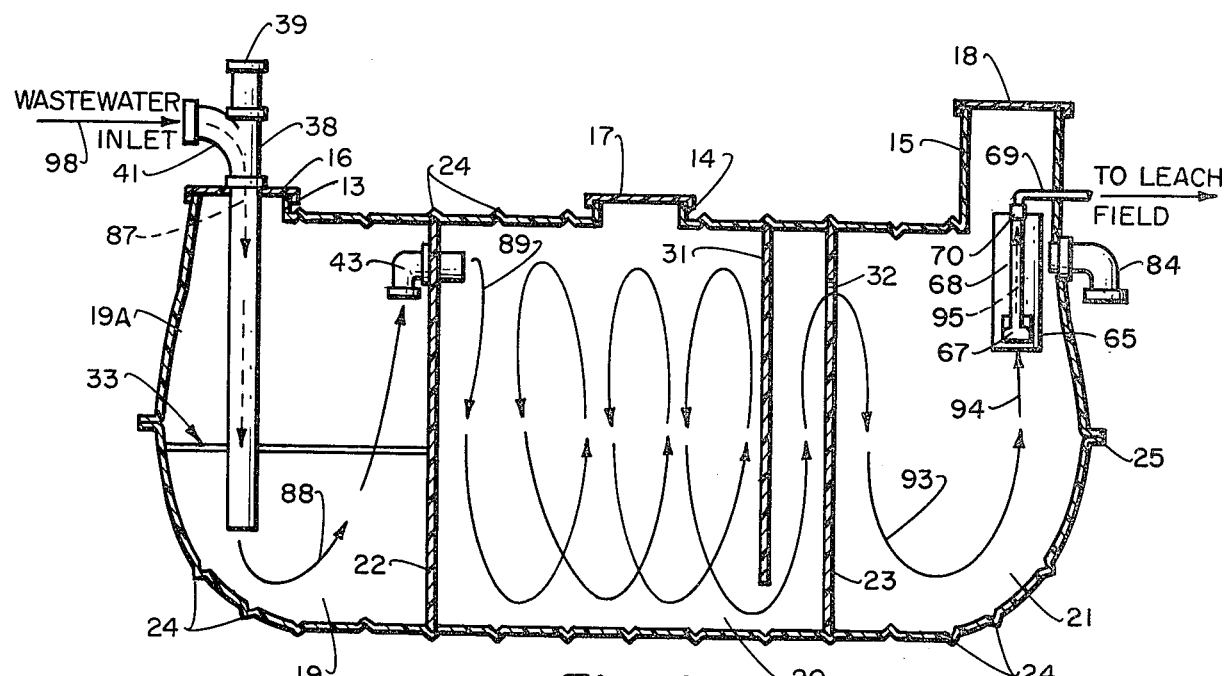
FIG. 9 is a flow diagram of the movement of the waste-water of the invention.

FIGS. 8 and 9 graphically illustrate the operation of tank 10. In FIG. 8 reference numeral 85 refers to the flow system provided by the various piping in each chamber 19 through 21 heretofore discussed. As air is introduced into system 85 through compressor 63, it enters each compartment 19 through 21. Flow is governed by air line flow gate valves ( 1 in each line) 100. Check valve 64 prevents air backup. In FIG. 9, wastewater enters tank 10 through inlet 41 down pipe 38 and into chamber 19 as indicated by arrows 87,88. From chamber 19, the wastewater flows through settling chamber 19A & pipe section 42,43 as indicated by arrow 89, into chamber 20 where it spirals and enters below baffle 31 and through opening 32 into chamber 21. In chamber 21, the wastewater flows up pipe 65 past pump 67, up pipes 68,69 (as indicated by arrows 93-96) through check valve 70 to a remote leach field (not shown). Air vent 40 is not visible from FIG. 9 due to orientation of the viewer.

As can be seen in FIG. 5, a combination of anaerobic and aerobic action takes place in chamber 19. An aerobic action takes place in the bottom digestion compartment 37 of chamber 19 when air is introduced during injection into system 85 (and out pipes 44,44', 45 and 45') creating air flows as indicated by arrows 46 through 49 (air also flowing upwardly through opening 35 in the funnel 33 as indicated by arrow 97 to the settling chamber 102 of chamber 19). Meanwhile, as indicated by arrow 98 in FIG. 5, wastewater enters chamber 19 through pipe 38 with solids settling to the bottom and fluids rising to the top in compartment 36 as indicated by the liquid level 29. Siphons 42,43 may be actuated by the addition of excess input into the first stage. The siphons as is explained infra draw liquid up from the upper compartment 36, to middle compartment 20. As shown in the third state in FIG. 7, if the liquid level rises to switch 78, pump 67 is actuated to pump out waste to the remote leach field. If the liquid level passes above switch 80 as high as 83 then the alarm 74 is actuated by switch 81. In any event, outlet 84 acts as a fail-safe device should the switches or pump fail to operate. As the wastewater circulates through tank 1, solid settling is dissipated. The injection of air during such circulation, as indicated by the air flow system 85 of FIG. 8, causes the wastewater to be agitated preventing solid settling. The aeration in the bottom compartment 37 of FIG. 5 takes place in a compartment which may be of relatively small volumetric capacity, e.g. 150 gallons, (whereas chamber 19 may be 300 gallons in volumetric capacity) moved by hydraulic pressure via pump 67 into second chamber 20, which may be of a greater volumetric capacity, e.g. 900 gallons. The fluid in compartment 36 (FIG. 5) is the cleanest water in the system. That is, chambers 19 and 21 may be of 300 gallons volumetric capacity with chamber 20 of 900 gallon volumetric capacity thus making the invention applicalbe to preexisting qualified septic tanks of 1500 gallon volumetric capacity.

After chamber 19, chamber 20 of FIG. 6 acts as a decomposition or aeration chamber with air entry controlled by compressor 63 which may be controlled by a timer to introduce air at predetermined times, e.g. every 15, 30, 45 or 60 minutes, since in such a system it would normally take solids about 45 minutes to fully settle and begin to make inactivated sludge.

The system disclosed herein keeps the solids in suspension thus preventing clogging. Sufficient amounts of suspended solids and biochemical oxygen demand are removed to comply with federal, state and local laws of such tanks. The effluent is aerated sufficiently so that odors are removed and almost all solids. Although tank 10 may be of any suitable configuration, it is preferably oval so that there are no corners which promote settling or dead space. A plurality of baffles or ribs 99 (FIG. 1) may be provided in the interior surfaces to tank 10 to provide a natural baffle system in all chambers to keep the wastewater in circulation. In FIG. 9, pipe 65 is a stilling tube terminating about 8 inches below the bottom of water level of tank 10 so that when aeration takes place via system 85, no aeration takes place inside tube or pipe 65.

I have found that a suitable three compartment tank of 1783 gallons divided as 601-808 and 324 gallon capacities, gives excellent results. Such a tank has met the approval of the Uniform Plumbing Code adapted in all states.

OPERATION

It can be seen that there is disclosed a wastewater disposal system in which aeration is used to keep solids from settling while the wastewater is siphoned by hydraulic pressure from a first blending chamber, divided into aerobic and anaerobic compartments, to a second decomposition chamber of aerobic and anaerobic compartments, then to a final purification chamber of aerobic and anaerobic compartments. Preexisting septic tanks may be quickly and easily converted into the system of the invention. The wastewater is removed from the final chamber to a remote leach field with little or no solids being present. A liquid level alarm system is provided for indicating the liquid levels and for signaling an alarm. A fail-safe outlet is also provided.

It is seen that the instant system provides for the introduction of oxygen into all three chambers such as to permit aerobic bacteria, which are 20x more efficient than anaerobic bacteria, to function in all three chambers. Without the piping in of air containing oxygen below the water surface level, aerobic bacteria could not function in the water. Thus for a minimum of about fifteen minutes out of each hour, air is pumped in below the water surface into each chamber.

The instant system has been designed such as to require no changes in the plumbing of the home in that there is indirect communication between the net flow input and the air vent. All stages operate aerobically at the same time and all states operate anaerobically at the same time, but no stage operates both anaerobically and aerobically simultaneously.

After the water is introduced through the inlet, the heaviest solids sink to the bottom. As the air comes in, it creates the swirl patterns 48, 49 as seen in FIG. 5 which permits the aerobic bacteria to go to work. During anaerobic times, lighter weight solids designated "floaters" in the trade, as distinguished from "sinkers" (heavier solids) float upward as designated by arrow 97 and are contained in 37. The distance between sinkers and floaters is the cleanest effluent which water rises through the separation 35 of the funnel 33. The sinkers and floaters both stay below the Vee for future digestion.

When the water level rises to the level of the siphons, liquid transfers from the first stage, or settling chamber to the middle or second chamber. While a part or a pair of parts could be used for fluid communication, it has been found that if elbows are used, any grease or soap films present on the surface of the water will not transfer to the second level, as the liquid transferring is below the elevation of the film or grease as can readily be seen from FIG. 5. When a volume, e.g. 5 gallons of new inffluent or waste water is inputted to the first stage, 5 gallons, e.g. the same amount departs through the siphons to the middle stage.

The middle stage operates both aerobically when oxygen is being pumped in and anaerobically when it is not being pumped in as there is no dissolved oxygen remaining in the liquid by the time it is transferred from stage 1 to stage 2. While a minimum of fifteen minutes of air input is suggested, the more people contributing waste, the longer the aeration cycle should be, thus the family size leans directly on aeration time which can be controlled by the time clock present. Thus a party of fifteen people inputing waste may require 45 minutes of aeration per hour. Thus, each chamber is aerated the same amount of time per hour as predetermined by the operator.

The second chamber is considered as the decomposition chamber. Most of the effect of the bacteria takes place here. The retention time here is about 24 hours such that the aerobic bacteria really has adequate opportunity to break down the solid waste. As 5 more gallons enter tank 1, 5 gallons transfers to the middle compartment, and 5 gallons transfer out of the middle compartment.

Baffle 31 tends to prevent any solids from exiting out part 32 by allowing such solids to first sink back into middle compartment due to the presence on the right side of baffle 31 of still water for further digestion as per the top of chamber 1, and then rise to the total elevation of the water after getting past the baffle.

In order to prevent clogging of air holes 55 in the air lines, it is preferred that the holes be angularly disposed rather than vertically disposed in such pipes as 59 and 60 as per FIG. 7. Air check valve 64 is to prevent infiltration of particles, however, even if small particles did get into those holes, the next blast of air would blow them out.

Another reason for not permitting the rest cycle, i.e. no air admission into any chamber for less than 15 minutes of an hour is that it is known that in septic systems, suspended solids take about 45 minutes under still conditions to settle to the bottom. Since aeration is timed here, no sludge can build up as the fluid is in motion an adequate amount of time.

The third chamber serves primarly for short term storage prior to the liquid being pumped out to the field. However, oxygen is added here too to further break down residual suspended waste. Thus water check valve 70 stops ground water infiltration into the tank and serves to hold water in an elevated disposal field.

Since all the controls are disposed within the apparatus, per FIG. 7, servicing is made quite simple. Further thought has been given to servicing by providing access entrances to each of the three stages. Access may be had merely by unscrewing the covers 16-18.

An independent testing laboratory has found the instant device to be superior to any septic system currently available in the marketplace.

I claim:

1. A system for the treatment of wastewater comprising:
a tank;
first and second baffle means dividing the tank into three separate chambers, a first blending chamber, a second decomposition chamber, and a third purification chamber;
means fluidly interconnecting the first chamber with said second chamber and said second chamber with said third chamber
air injecting means for injecting air simultaneously into all of said chambers; and
third baffle means dividing said first chamber into an upper anaerobic compartment and a lower aerobic compartment, said air injecting means opening into said aerobic compartment further including wastewater inlet means opening into the lower aerobic compartment;
wherein said means fluidly interconnecting said first chamber with said second chamber includes a pipe section having an inlet in the upper anaerobic section of said first chamber, and extending through said first baffle means and having an outlet in the upper portion of said second chamber,
said third baffle means is a funnel formed of corrugated material having an opening at the bottom thereof, said means fluidly connecting said second chamber with said third chamber includes an opening in the upper portion of said baffle means dividing said third chamber from said second chamber, said second chamber includes a baffle spaced from both the bottom of said tank and from said baffle means dividing said third chamber from said second chamber, to prevent solids from exiting said second chamber, and said third chamber includes a vertical outlet pipe in the upper portion, and pumping means mounted in said outlet pipe for pumping wastewater out of said tank.

2. In the system of claim 1 including air compression means controlling said air injecting means for controlling the amount and duration of air injection.

3. In the system of claim 1 wherein said outlet pipe is a stilling tube and also including sensing means associated with said pumping means for sensing the liquid level in said tank and selectively activating or deactivating said pumping means.

4. In the system of claim 3 including alarm means including liquid level measurement means, associated with said thrid chamber for actuating a remote alarm when the liquid level in said tank rises about a predetermined level.

5. In the tank of claim 1 including a plurality of ribs disposed in each chamber of the interior of said tank to keep the wastewater in circulation.

6. In the tank of claim 1 wherein said tank is generally oval in configuration with no sharp internal corners.

7. In the system of claim 1 wherein the air injection means controlled by a time clock.

* * * * *